United States Patent
Wienand et al.

(10) Patent No.: US 6,380,840 B1
(45) Date of Patent: *Apr. 30, 2002

(54) TEMPERATURE SENSOR WITH MEASURING RESISTOR

(75) Inventors: Karlheinz Wienand, Aschaffenburg; Frank Schlag, Hamburg; Gerhard Damaschke, Flörshiem, all of (DE)

(73) Assignee: Heraeus Electro-Nite International N.V., Houthalen (BE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,407

(22) Filed: Dec. 28, 1999

Related U.S. Application Data

(63) Continuation of application No. 08/847,263, filed on May 1, 1997, now abandoned.

(30) Foreign Application Priority Data

May 24, 1996 (DE) ............................................. 196 21 000

(51) Int. Cl.[7] ................................................. H01L 7/13
(52) U.S. Cl. ............................................ 338/25; 338/28
(58) Field of Search ........................... 338/25, 28, 273, 338/275, 276, 22 R, 22 SD; 374/185, 208

(56) References Cited

U.S. PATENT DOCUMENTS

| | | | |
|---|---|---|---|
| 3,824,328 A | 7/1974 | Ting et al. .................. 174/52.2 |
| 4,050,052 A | 9/1977 | Reichelt et al. | |
| 4,339,768 A | 7/1982 | Keller et al. | |
| 4,368,453 A | 1/1983 | Herden et al. ................. 338/25 |
| 4,437,084 A | 3/1984 | Clayton, Jr. ............... 338/22 R |
| 4,630,477 A | 12/1986 | Murtland, Jr. ................ 73/295 |
| 4,841,273 A | 6/1989 | Horton ......................... 338/28 |
| 4,955,980 A | 9/1990 | Masuo ........................ 374/185 |
| 5,015,988 A | 5/1991 | Fletcher ....................... 338/28 |
| 5,149,200 A | 9/1992 | Shiokawa et al. ........... 374/185 |
| 5,247,277 A | 9/1993 | Fang et al. ................ 338/22 R |
| 5,367,282 A | 11/1994 | Clem ........................ 338/22 R |
| 5,610,572 A | 3/1997 | Yajima ..................... 338/22 R |

FOREIGN PATENT DOCUMENTS

| | | |
|---|---|---|
| DE | 2313756 | 10/1974 |
| DE | 25 27 739 B2 | 12/1976 |
| DE | GM 79 19 142 | 10/1979 |
| DE | 29 19 433 A1 | 12/1980 |
| DE | 31 11 948 A1 | 10/1982 |
| DE | G 89 13 803.1 | 4/1990 |
| DE | 41 04 674 A1 | 8/1992 |
| DE | 44 45 243 A1 | 6/1995 |
| GB | 2 285 138 A | 6/1995 |
| JP | 55 134325 A | 10/1980 |
| JP | 4 194628 A | 7/1992 |

OTHER PUBLICATIONS

European Search Report for corresponding European Patent Application No. 97108181.5 (Aug. 29, 1997), 3 pages.

*Primary Examiner*—Karl D. Easthom
(74) *Attorney, Agent, or Firm*—Akin, Gump, Strauss, Hauer & Feld, L.L.P.

(57) ABSTRACT

An easy to manufacture temperature sensor has a measuring resistor with a substrate having an electrically insulating surface and a resistance layer situated thereon. The measuring resistor is surrounded by a casing of temperature-stable plastic, which serves as a primary housing, which together with the embedded measuring resistor is surrounded by an additional plastic extrusion coating as an outer housing, wherein the leads of the measuring resistor are passed through the primary housing and the plastic extrusion coating to the outside. The measuring resistor is suited for use in durable consumer goods, as for example washing machines, dryers and motor vehicles.

6 Claims, 3 Drawing Sheets

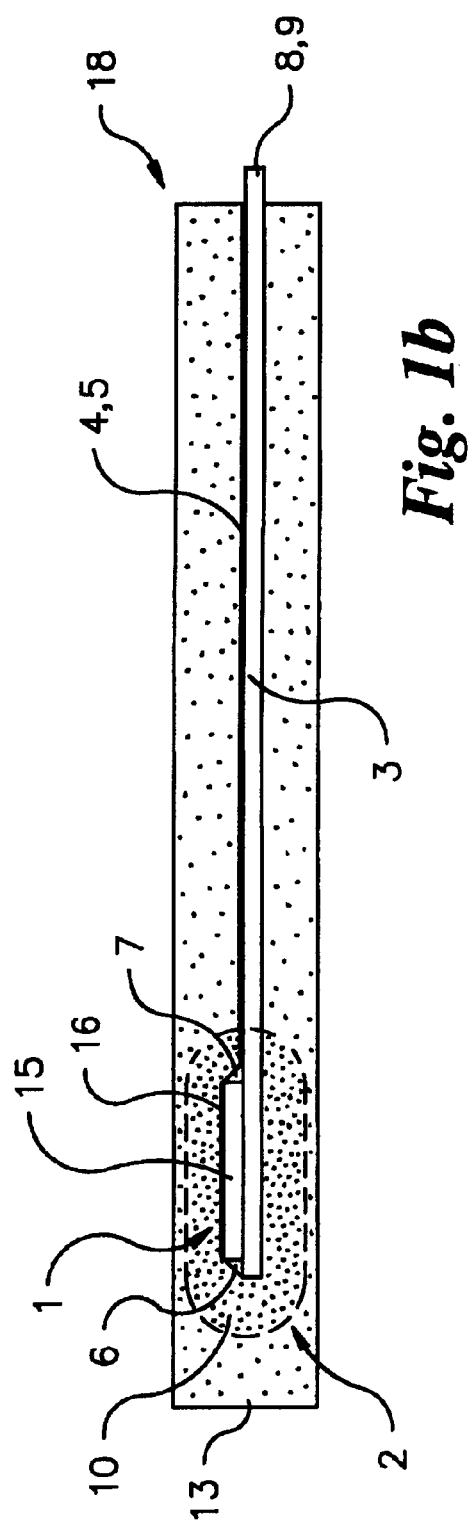
*Fig. 1b*
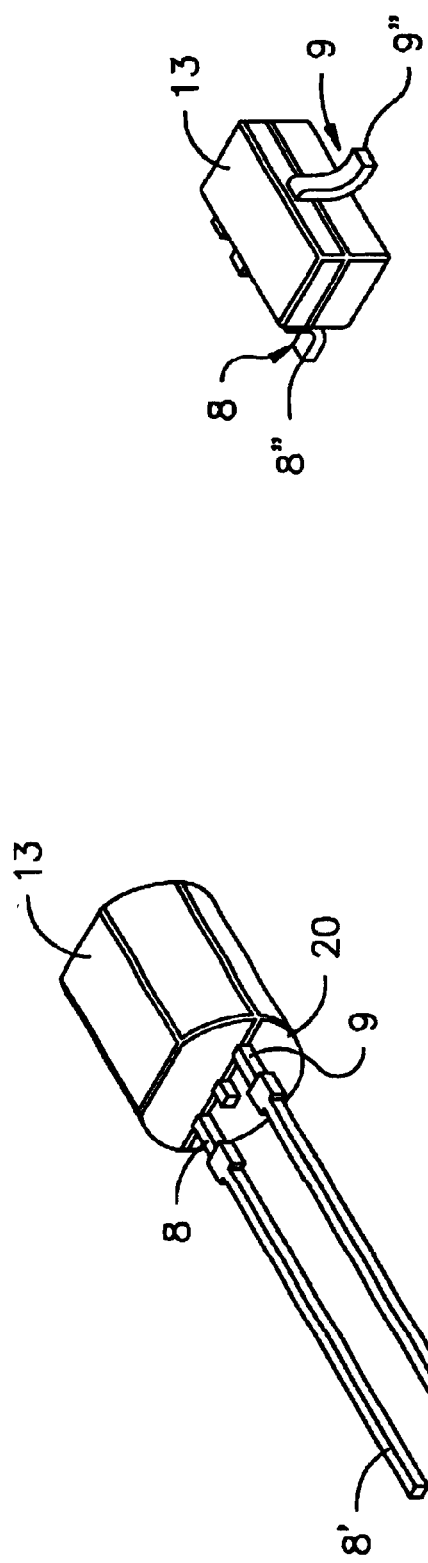
*Fig. 2a*
*Fig. 2b*

TEMPERATURE SENSOR WITH MEASURING RESISTOR

CROSS-REFERENCE TO RELATED APPLICATIONS

This application is a continuation of Application Ser. No. 08/847,263, filed May 1, 1997 now abandoned.

BACKGROUND OF THE INVENTION

The invention concerns a temperature sensor with measuring resistor comprising a substrate with an electrically insulating surface and a resistance layer situated thereon, wherein the measuring resistor is surrounded by a casing of temperature-stable plastic through which leads of the measuring resistor are passed.

From DT 25 27 739 B2, (U.S. Pat. No. 4,050,052) a procedure is known for producing an electrical measuring resistor for a resistance thermometer in which a platinum thin film with a predetermined temperature coefficient is applied on a carrier of ceramic material, and the measuring resistor is subsequently provided with a temperature-stable cover layer, for example of epoxide resin, in order to be resistant to thermal and mechanical stresses. Moreover, the cover layer should offer protection against diffusion from the gas phase, solid substances from the surroundings, or against objects coming into contact with the measuring resistor.

Furthermore, from German utility model 89 13 803.1 a resistance thermometer is known for measuring surface temperature in which a metal layer temperature sensor is surrounded by a plastic casing through Which the leads of the resistance thermometer are passed to the outside. The plastic casing is manufactured in a multiple plastic extrusion die and is made of epoxide resin. The temperature sensor is provided for direct mounting on a surface whose temperature is to be measured.

Moreover, from DE 41 04 674 A1 a temperature sensor is known in which the measuring resistor serving as a sensor is formed by a platinum thin layer resistor on the front side of a plate-shaped carrier made of ceramic. This is enclosed in a basically pressure-tight tube-shaped glass housing, where it lies essentially free of tension only on its longitudinal edges, while all remaining smooth surfaces and edge surfaces, just like the measuring resistor itself are arranged completely contact-free in relation to the housing. In this way, the carrier can be enclosed vibration-free without there resulting an appreciable worsening of response behavior. Because of the relatively exact centering or precise alignment of the carrier in relation to the housing, manufacture is comparatively expensive.

Furthermore, from German utility model 79 19 142 a thin layer measuring resistor is known for temperature measurements in which a ceramic platelet is provided as a carrier with a thin platinum coating as a resistance layer, wherein the resistance layer has electrically connected lead wires. The thin layer measuring resistor is arranged in a ceramic housing which consists of two halves; wherein the halves are fused or glued together at their interface with a binding agent, and the connecting wires leading outward from the measuring resistor are embedded in the binding agent. Owing to the two-shell housing, a comparatively precise construction is necessary.

BRIEF SUMMARY OF THE INVENTION

An object of the invention is to create a comparatively simple to produce temperature sensor which can be manufactured economically and can be installed in durable consumer goods, as for example, washing machines, dryers, and temperature regulators in motor vehicles.

The object is accomplished in that a casing serves as a primary housing which together with the embedded measuring resistor is surrounded by an additional plastic extrusion coating as an outer housing, wherein the leads are passed to the outside through the plastic extrusion coating.

The simple, robust construction proves especially advantageous for optimal sealing against the surrounding atmosphere, so that the sensor can also be used in an aggressive environment. In addition to this, it can be economically produced.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1b shows a sensor according to FIG. 1 in longitudinal section;

FIGS. 2a and 2b show a temperature sensor with TO housing or SOT housing and lead contacts.

DETAILED DESCRIPTION OF THE INVENTION

Figure 1A:
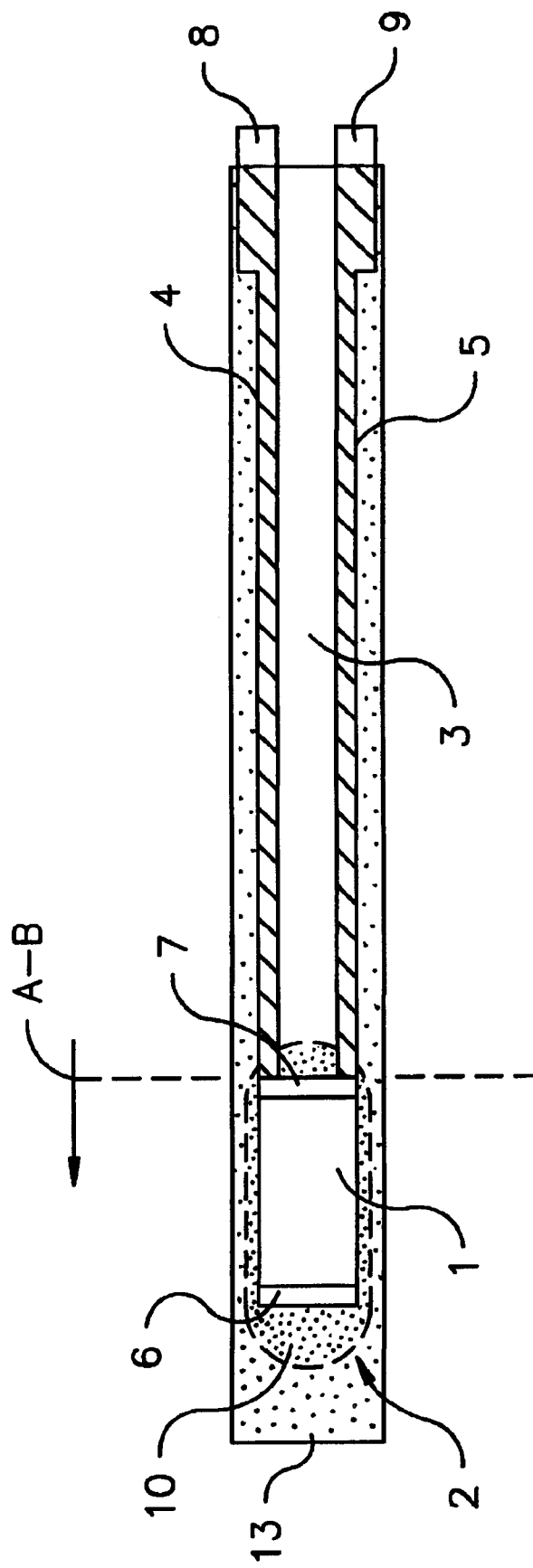
FIG. 1a shows a cut-away top view of a temperature sensor in connection with which the measuring resistor is applied to a board in SMD construction.

In accordance with FIG. 1a, measuring resistor 1 is arranged at one end 2 of an elongated board 3, and applied by means of SMD (surface mounted device) soldering. The measuring resistor is connected with external lead contacts 8, 9 of the temperature sensor by means of lead contacts 6, 7 and through strip conductors 4, 5. The measuring resistor 1 comprises a plate-shaped ceramic substrate with an electrically insulating surface to which the measuring resistor is applied in the form of a platinum thin layer. As is known from DE 25 27 739 B2, such measuring elements can have, for example, a meander shaped resistance layer, which will not, however, be gone into further here. In the cut-away top view of the sensor the plastic casing 10, which may be a silicone lacquer, for example, is recognizable as a sealing primary housing which is penetrated with a lead-through aperture for the part of board 3 leading to the external lead contacts 8, 9. The outer lead contacts 8, 9 are constructed as plugs. The primary housing consisting of the plastic casing 10 and the board 3 are in turn enclosed by a plastic extrusion coating 13, which may be a thermosetting plastic, whereby the external lead connection contacts 8, 9 project as plug contacts out of this plastic extrusion coating 13, which hermetically seals the board as well as the measuring resistor. Measuring resistor 1 is soldered directly to respective strip. conductors 4, 5 on the board 3 in the area of the lead contacts 6,7.

Figure 1C:
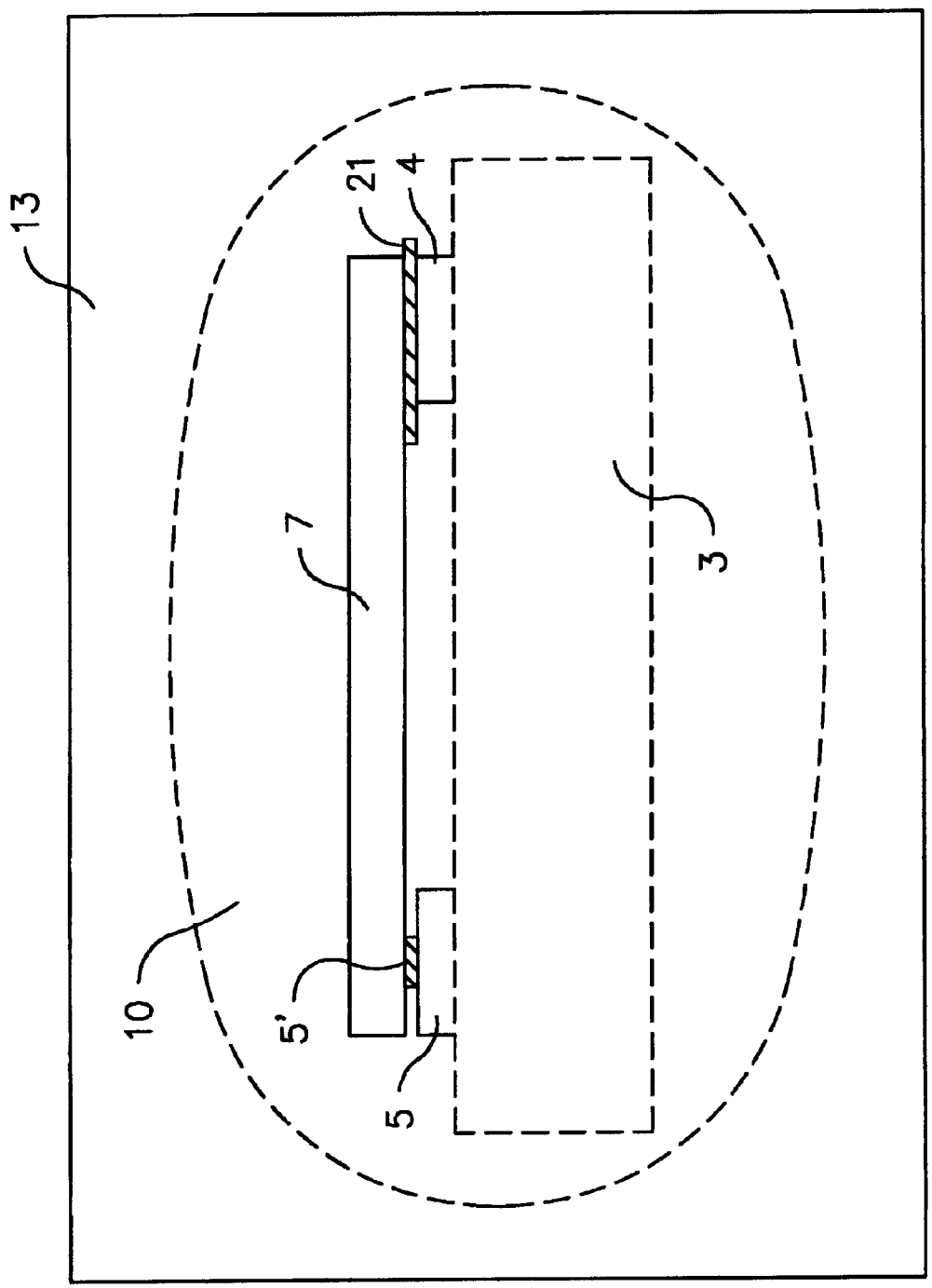
FIG. 1c is a greatly enlarged, cross-sectional view of the temperature sensor shown in FIG. 1a, taken along the line A–B.

On the basis of the longitudinal section in accordance with FIG. 1b, measuring resistor 1 can be seen in elevation, the substrate 15 of which is constructed as a plate-shaped ceramic part, which is constructed as electrically insulating at least in the surface area facing the resistance layer 16. The resistance layer 16 has the lead contacts 6, 7 at its opposite ends which are respectively directly soldered to strip conductors 4, 5 on the board 3 in a mutually electrically insulating manner, for example, as shown in FIG. 1*c* by soldering point 5' and insulating sheath 21. Thus, for example, lead contact 6 is electrically and mechanically firmly connected with strip conductor 4 by soldering, and lead contact 7 correspondingly with strip conductor 5. Measuring resistor 1 is, together with end 2 of board 3, embedded in the plastic casing 10, whereby this comprises the primary housing. The plastic casing 10, as well as a large part of circuit board 3, is enclosed by plastic extrusion coating 13 as an external housing, which in the area of end 18 has an opening for passage of the conductors for the external lead contacts 8, 9 constructed as plugs. Through shortening of the circuit board 3, it is possible to position a temperature sensor, for example in a typical semiconductor housing, as it is subsequently represented in FIGS. 2*a* and 2*b*.

FIG. 2*a* depicts in a perspective representation a temperature sensor in accordance with FIGS. 1*a*, 1*b*, whose plastic extrusion coating 13 is constructed as a TO (transistor outline) housing, as it usually finds application in the field of semiconductor elements. Transistor housings for printed circuit board components are usually designated with TO, wherein the outer lead contacts 8, 9 in the area of connection surface 20 are constructed in the form of elongated prongs 8', 9', which are suited for soldering to ordinary circuit boards. It is, however, also possible to introduce the prongs 8', 9' into plug sockets in order, if necessary, to obtain a rapid exchangeability.

Furthermore, FIG. 2*b* shows a plastic extrusion coating 13 which is constructed as a so-called SOT (small outline transistor) housing. Such SOT housings serve for equipping printed circuit boards in SMD technology, wherein the outwardly directed contacts 8, 9 with their solder surfaces 8", 9" can be directly soldered on contact surfaces of SMD technology printed circuit boards. Such SOT housings are especially suited for miniaturization purposes.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A temperature sensor comprising a measuring resistor (1), at least two conductors (4, 5) electrically connected to the measuring resistor (1) at one end of the conductors and having outer connection contacts (8, 9) at a second end of the conductors, a plastic casing (10) serving as a primary, inner housing for the measuring resistor (1), and a plastic extrusion coating (13) serving as an outer housing for the measuring resistor (1), wherein the measuring resistor (1) comprises a surface mounted device having a resistance layer (16) situated on an electrically insulating surface of a substrate (15), wherein the plastic casing (10) comprises a temperature-stable plastic which seals the measuring resistor (1) against its surroundings, and wherein the measuring resistor (1) and plastic casing (10) are surrounded by the plastic extrusion coating (13), except that the at least two conductors (4, 5) pass gas and liquid tight through the plastic casing (10) and plastic extrusion coating (13) extending from the measuring resistor (1) to the outer connection contacts (8, 9).

2. The temperature sensor according to claim 1, wherein the outer connection contacts (8, 9) comprise soldering contacts for surface mounted device assembly.

3. The temperature sensor according to claim 1, wherein the at least two conductors (4, 5) are supported by a board (3), the measuring resistor (1) is soldered to the conductors (4, 5) via lead contacts (6, 7) near one end of the board (3), and the outer connection contacts (8, 9) are constructed as a plug in a form of prongs at a second end of the board (3).

4. The temperature sensor according to claim 1, wherein the plastic casing (10) comprises a silicone lacquer.

5. The temperature sensor according to claim 1, wherein the outer plastic extrusion coating (13) comprises a thermosetting plastic.

6. The temperature sensor according to claim 1, wherein the outer plastic casing (13) comprises a transistor outline housing, which in an area of its connection surface (20) has external connection contacts in the form of prongs (8', 9').

* * * * *